(12) United States Patent
Zhao et al.

(10) Patent No.: US 11,598,932 B2
(45) Date of Patent: *Mar. 7, 2023

(54) DRIVING DEVICE CASING, DRIVING DEVICE, CAMERA DEVICE AND ELECTRONIC APPARATUS

(71) Applicant: New Shicoh Motor Co., LTD, Zhejiang (CN)

(72) Inventors: Lu Zhao, Zhejiang (CN); Juhe Zhou, Zhejiang (CN)

(73) Assignee: NEW SHICOH MOTOR CO., LTD, Zhejiang (CN)

( * ) Notice: Subject to any disclaimer, the term of this patent is extended or adjusted under 35 U.S.C. 154(b) by 335 days.

This patent is subject to a terminal disclaimer.

(21) Appl. No.: 16/837,604

(22) Filed: Apr. 1, 2020

(65) Prior Publication Data

US 2020/0301099 A1 Sep. 24, 2020

(30) Foreign Application Priority Data

Mar. 20, 2019 (CN) .......................... 201910214390.5

(51) Int. Cl.
*G02B 7/10* (2021.01)
*H04N 5/225* (2006.01)
(Continued)

(52) U.S. Cl.
CPC ........... *G02B 7/102* (2013.01); *H04N 5/2253* (2013.01); *H04N 5/23209* (2013.01); *H04N 5/23212* (2013.01)

(58) Field of Classification Search
CPC . G02B 7/102; G02B 7/09; G02B 7/04; H04N 5/2253; H04N 5/23209;
(Continued)

(56) References Cited

U.S. PATENT DOCUMENTS 11,378,780 B2 * 7/2022 Zhao .................. G02B 7/08
2019/0129130 A1 * 5/2019 Tseng ................ G02B 7/08
(Continued)

FOREIGN PATENT DOCUMENTS

CN 101315456 A 12/2008
JP 2008058659 A 3/2008
(Continued)

OTHER PUBLICATIONS

Office Action dated Jun. 8, 2021, received in Japanese Patent Application No. 2020-190725 A, English Translation, 2 pages.

*Primary Examiner* — Albert H Cutler
(74) *Attorney, Agent, or Firm* — Hayes Soloway PC

(57) ABSTRACT

According to an embodiment, a driving device housing with an axial direction is provided. The driving device housing is made of permeability magnetic material and polygonal in outer shape. The driving device housing includes an outer peripheral side wall and a housing top wall connected to a front side of the outer peripheral side wall. The housing top wall includes an opening allowing light to pass through. The housing further includes at least one step portion at each corner portion thereof. The step portion includes a step horizontal wall extending in a direction intersecting with the axial direction and a step vertical wall extending from the step horizontal wall toward a front side or a rear side. A magnet mounting portion is formed by an inner peripheral wall surface of the step vertical wall and an inner peripheral wall surface of the outer peripheral side wall adjacent thereto.

17 Claims, 6 Drawing Sheets

(51) Int. Cl.
  *H04N 5/232* (2006.01)
  *G02B 7/09* (2021.01)
  *G02B 7/04* (2021.01)
  *G03B 13/32* (2021.01)
  *G03B 17/02* (2021.01)

(58) Field of Classification Search
  CPC ............. H04N 5/23212; H04N 5/2257; H04N 5/2254; G03B 13/32; G03B 17/02
  See application file for complete search history.

(56)  References Cited

U.S. PATENT DOCUMENTS

2020/0209710 A1\* 7/2020 Park .................. H04N 5/225
  2022/0094830 A1\* 3/2022 Lee ................... H04N 13/271

FOREIGN PATENT DOCUMENTS

KR   20160021562   \*   2/2016
  KR   20160021562 A     2/2016

\* cited by examiner

DRIVING DEVICE CASING, DRIVING DEVICE, CAMERA DEVICE AND ELECTRONIC APPARATUS

CROSS-REFERENCE TO RELATED APPLICATION

This application claims the benefit of Chinese patent application CN 201910214390.5 filed on Mar. 20, 2019, the contents of which are incorporated by reference herein.

TECHNICAL FIELD

The present disclosure relates to a driving device housing, a driving device, a camera device and an electronic apparatus.

BACKGROUD

In the camera device of an electronic apparatus, by the interaction between the magnetic field generated when the coil provided in the driving device is energized, and the magnetic field generated by the magnet, the lens is driven so that is can move in the electronic apparatus to achieve the purpose of focusing.

For example, Chinese Laid-Open Patent Publication No.CN101315456A describes a lens driving device in a camera, which has an approximately rectangular parallelepiped housing, and triangular prism-shaped magnets are provided at four corner portions of the housing.

In addition, FIG. 1 shows a housing 9 of another conventional lens driving device. The housing 9 is in a rectangular parallelepiped shape. Steps 92 recessed downward from the front surface 90 of the housing are provided at the four corner portions 91 of the housing 9, and the magnets are respectively adsorbed to the corner portions 91 inside the housing 9 and positioned by the bottom surfaces 920 of the steps 92.

However, the magnets provided at the corner portions of the housing in the conventional driving device are formed in a triangular prism shape to fit the shape of the housing, occupying a large space. For that reason, when reducing the size of the magnets in order to reduce the external size of the lens driving device, it is easy to cause demagnetization.

SUMMARY

An object of the present disclosure is to provide a driving device housing that can reduce the usage amount of magnets without affecting the performance of the driving device, and to provide a driving device, a camera device and an electronic apparatus.

In accordance with a first aspect of the present disclosure, there is provided a driving device housing with an axial direction. The driving device housing is made of permeability magnetic material and polygonal in outer shape. The driving device housing includes an outer peripheral side wall and a housing top wall connected to a front side of the outer peripheral side wall. The housing top wall is provided with an opening allowing light to pass through. The housing further includes at least one step portion at each corner portion thereof. The step portion includes: a step horizontal wall extending in a direction intersecting with the axial direction; and a step vertical wall extending from the step horizontal wall toward a front side or a rear side. A magnet mounting portion is formed by an inner peripheral wall surface of the step vertical wall and an inner peripheral wall surface of the outer peripheral side wall adjacent thereto.

In accordance with a second aspect of the present disclosure, there is provided a driving device including: the housing as described above; a magnet disposed at the magnet mounting portion; a lens support disposed in the housing; a spring supporting the lens support on at least one of a front side and a rear side of the lens support; a coil disposed on an outer peripheral side of the lens support; and a base supporting the housing at a rear side of the housing. The magnet includes a side surface in close contact with the inner peripheral wall surface of the step vertical wall and the inner peripheral wall surface of the outer peripheral side wall adjacent thereto in the magnet mounting portion.

In accordance with a third aspect of the present disclosure, there is provided a camera device including the driving device as described above.

In accordance with a fourth aspect of the present disclosure, there is provided an electronic device including the camera device as described above.

BRIEF DESCRIPTION OF THE DRAWINGS

The above and other features, properties and advantages of the present disclosure will become more apparent from the following description in conjunction with the accompanying drawings and Examples.

DETAILED DESCRIPTION

Figure 1:
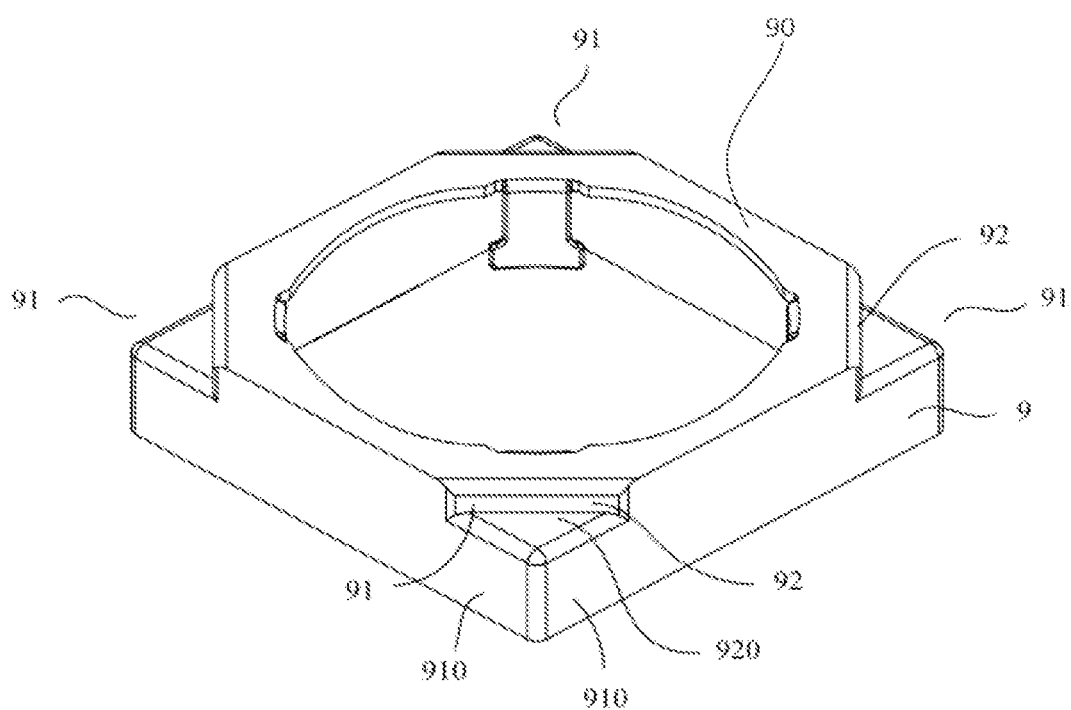
FIG. 1 shows a schematic perspective view of a housing of a conventional driving device.

In the following description, various embodiments or Examples for implementing the subject technical solutions are disclosed. The specific examples of the components and the arrangements are described below for the purpose of simplifying the disclosure, and of course, these are merely examples, and are not intended to limit the protection scope of the present application. For example, the specification may include an embodiment in which a first feature is formed over or on the second feature, and may include an embodiment in which the first and second features are formed by direct contact, and may also include an embodiment in which an additional feature is formed between the first feature and the second feature, so that the first feature and second feature may not be directly related. Additionally, reference numerals and/or letters may be repeated in different examples in these disclosures. This repetition is for the sake of brevity and clarity, and does not by itself represent the relationship between the various embodiments and/or structures to be discussed. Further, when the first element is described to be connected or in combination with the second element, the description includes embodiments in which the first and second elements are directly connected or combined with each other, and also includes the use of one or more other intervening elements to indirectly connect or join the first and second elements to each other.

It should be noted that in the case of use, the "up", "down", "left", "right", "front", "rear", "top", "bottom", "positive", "reverse", "clockwise" and "counterclockwise" in the following description are only used for convenience and do not imply any specific fixed direction. In fact, they are used to reflect the relative position and/or direction between various portions of the object.

The driving device of the present embodiment is disposed in the camera device and is used for driving the lens to move along the optical axis thereof, thereby playing a role of focusing. FIG. 2 shows an exploded schematic view of a driving device according to an embodiment. The driving device includes a housing 1 and a base 2 for supporting the housing that is a cover. A front side spring 3, a rear side spring 4, a lens support 5, a magnet 6 and a coil 7 are respectively disposed in the housing 1. The dashed line shown in FIG. 1 indicates the optical axis of the lens 8 and passes through the center of the lens 8 and corresponds to the axis of the driving device and the axis of the housing 1. In the present embodiment, the object side in the optical axis direction of the lens 8 is set as the front side, and the opposite side is set as the rear side.

Figure 3:
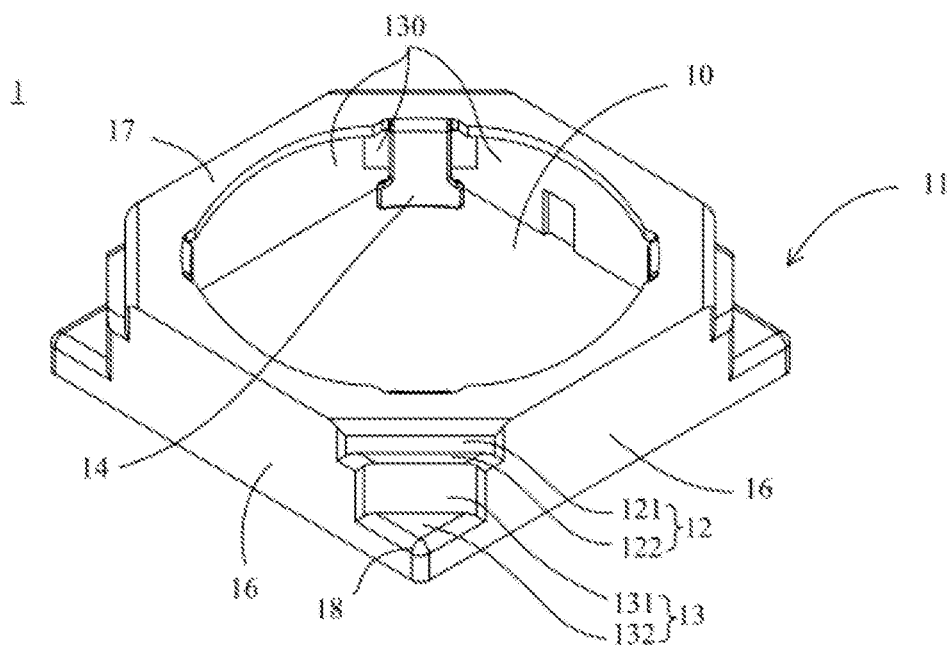
FIG. 3 is a schematic perspective view of a housing of a driving device according to an embodiment of the present disclosure.

FIG. 3 is a schematic perspective view of the housing 1 in the driving device. As detailed in FIG. 3, the housing 1 of the driving device is in a polygonal shape, and it has an axial direction along the optical axial direction of the driving device. In the present embodiment, it has a square shape. The housing 1 includes an outer peripheral side wall 16 and a housing top wall 17 connected to the front side of the outer peripheral side wall 16. The housing top wall 17 is provided with an opening 10 allowing light to pass through in the camera device.

Each corner portion 11 of the housing 1 includes at least one step portion. The step portion is recessed downward in the thickness direction of the housing 1 and is formed in a step shape at each corner portion 11. The step portion includes a step horizontal wall extending in a direction intersecting with the axial direction of the housing, and a step vertical wall extending from the step horizontal wall to the front side or the rear side. The inner peripheral wall surface of the step vertical wall and the outer peripheral side wall 16 adjacent thereto form a mounting portion of the magnet.

In the embodiment shown in FIG. 3, the housing 1 is recessed downward, at each corner portion 11, in the thickness direction of the housing 1 a plurality of times to form a plurality of step portion. The step portion includes a first step portion 12 and a second step portion 13. The first step portion 12 includes a first step vertical wall 121 extending from the housing top wall 17 to the rear side, and a first step horizontal wall 122 extending from the rear side of the first step vertical wall 121 in a direction intersecting with the axis direction of the housing 1. The second step portion 13 includes a second step vertical wall 131 extending from the first step horizontal wall 122 to the rear side, and a second step horizontal wall 132 extending from the rear side of the second step vertical wall 131 in a direction intersecting with the axial direction of the housing 1, so that two step-shaped portions of the first step portion 12 and the second step portion 13 are formed. It should be noted that the first step vertical wall 121 and the second step vertical wall 131 are the aforementioned step vertical wall, and the first step horizontal wall 122 and the second step horizontal wall 132 are the aforementioned step horizontal wall. The inner peripheral wall surface of the second step vertical wall 131 and the inner peripheral wall surface of the outer peripheral side wall 16 adjacent thereto form together a magnet mounting portion 130 for mounting the magnet 6.

Figure 4:
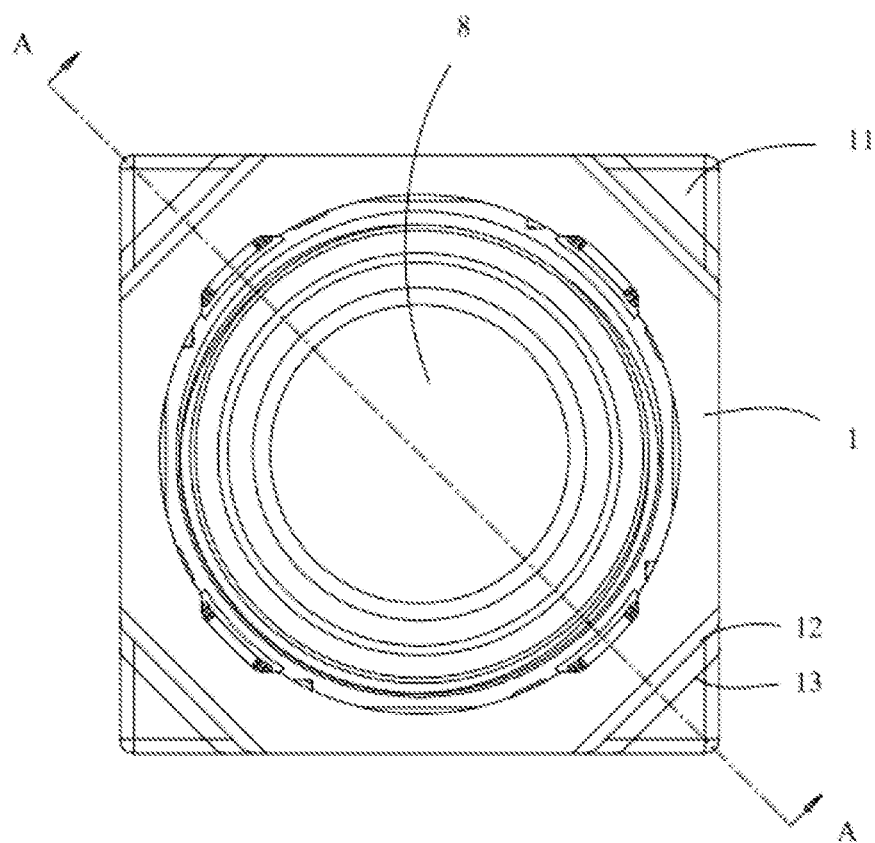
FIG. 4 is a schematic top view of a driving device according to an embodiment of the present disclosure.
Figure 5:
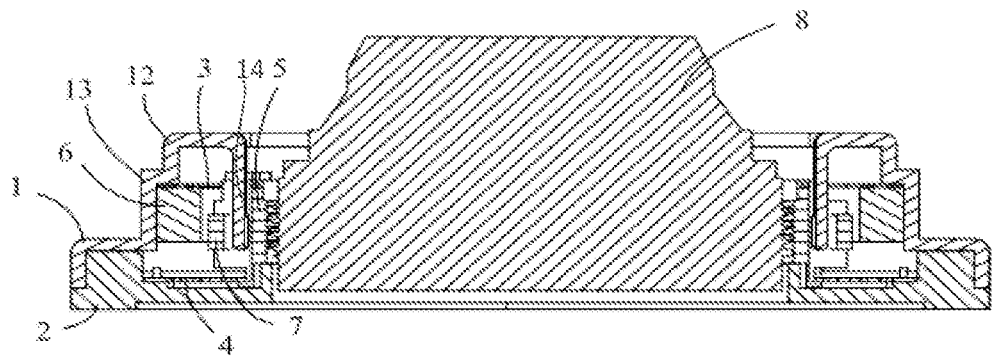
FIG. 5 is a schematic cross-sectional view taken in the direction of A-A in FIG. 4.

FIG. 4 is a schematic top view of a driving device according to the present embodiment. FIG. 5 is a schematic cross-sectional view taken in the direction of A-A in FIG. 4. In combination with FIG. 2 to FIG. 5, the lens support 5 is disposed within the housing 1 for supporting the lens 8. The front side spring 3 is disposed between the lens support 5 and the housing 1, and the rear side spring 4 is disposed between the lens support 5 and the base 2. The front side spring 3 and the rear side spring 4 elastically support the lens support 5 in the housing 1, while allowing the lens support 5 to move in the optical axial direction (that is, the axial direction of the housing 1) when subjected to a driving force. In an embodiment different from that shown in the drawings, even when the front side spring 3 and the rear side spring 4 are disposed on at least one of the front side and the rear side of the lens support 5, they can also play a role of elastically supporting the lens support 5.

The coil 7 is provided by being wound with the axial direction of the housing 1 as a winding axis so as to surround the outer periphery of the lens support 5 and generates a magnetic circuit on the outer circumferential surface of the lens support 5 after being energized. The housing 1 is made of a magnetically conductive material, and the magnet 6 is adsorbed to the corner portion 11 on the inner peripheral side of the housing 1. The magnet 6 has a side surface 60 that can be in close contact with the inner peripheral wall surface of the second step vertical wall 131 in the magnet mounting portion 130 and the inner peripheral wall surface of the outer peripheral side wall 16 adjacent thereto, respectively. When assembled, the side surface 60 of the magnet 6 is adsorbed to the inner peripheral wall surface of the second step vertical wall 131 and the inner peripheral wall surface of the outer peripheral side wall 16 adjacent thereto, respectively, so that the assembly of the magnet 6 and the housing 1 is completed. It is to be noted that four coils 7 with a winding axis in a direction orthogonal to the optical axis may be fixed to the outer periphery of the lens support 5 and face the magnet 6.

Figure 2:
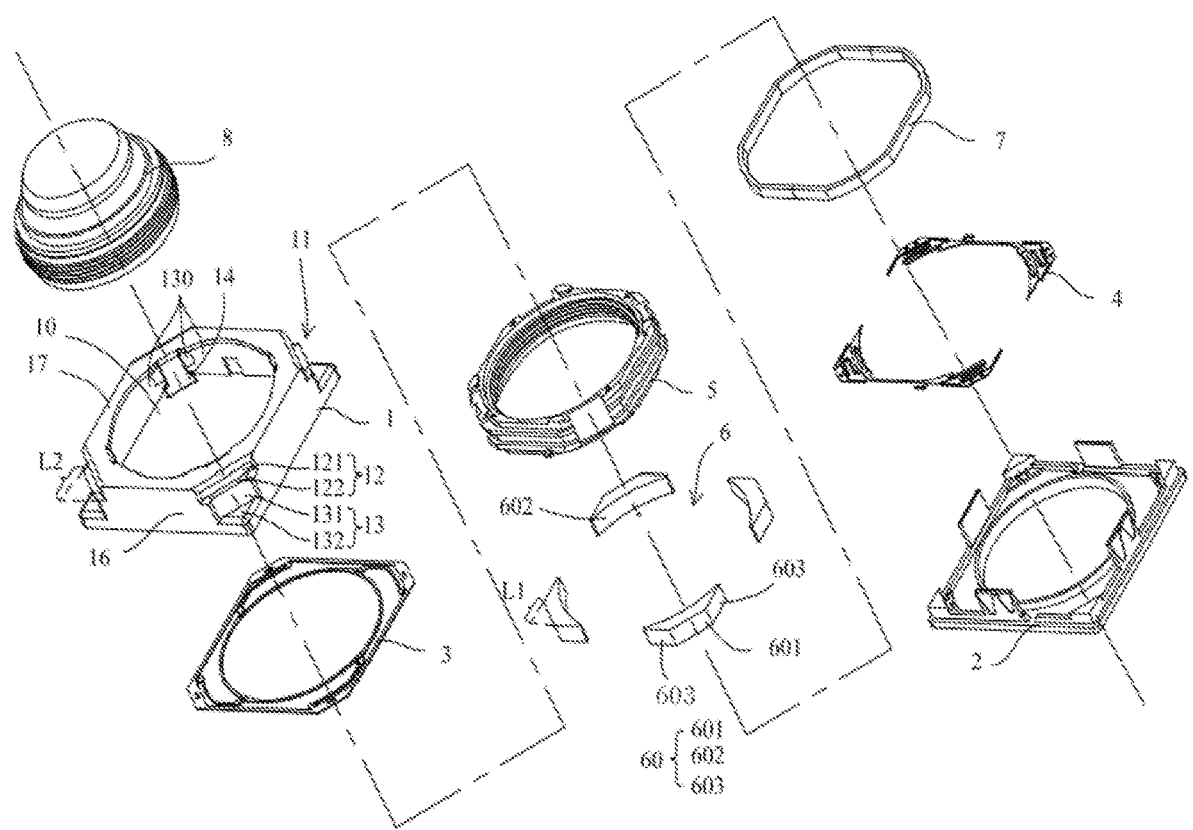
FIG. 2 shows an exploded schematic view of a driving device according to an embodiment of the present disclosure.

Refer to FIG. 1, and FIGS. 3 and 5 for comparison. In the housing 9 of the conventional driving device shown in FIG. 1, the magnet is mounted by being adsorbed to the corner side surface 910 of the housing 9. As shown in FIG. 3 and FIG. 5, the magnet 6 is contacted and adsorbed to the inner peripheral wall surface of the second step vertical wall 131 and the inner peripheral wall surface of the outer peripheral side wall 16 adjacent thereto at the side surface 60 of the magnet 6. Since the side surface 60 of the magnet 6 is a region with a dense magnetic field, it is possible to prevent the loss of magnetic field due to the gap by directly contacting the side surface 60 of the magnet 6 with the housing 1, thereby achieving a better magnetic permeability effect. When the coil 7 is energized to form a magnetic circuit, the magnet 6 will generate an ampere force to the energized coil and push the coil 7 to move. That is, the lens support 5 and the lens are moved. In the magnetic circuit, the larger the magnetic flux is, the greater the Ampere force is generated under the same current. Therefore, a larger magnetic flux can be obtained by preventing the loss of magnetic field, thereby generating a larger Ampere force. Refer to Table 1 below for details:

TABLE 1

Ampere force data for different magnet arrangement modes

| Variation in the magnet size L1 (mm) | Variation of reduction in the corner size of the casing L2 (mm) | Forward movement amount of the coil (mm)/Ampere force (N) | | | | | |
|---|---|---|---|---|---|---|---|
| | | 0 mm | 0.05 mm | 0.1 mm | 0.15 mm | 0.2 mm | 0.25 mm |
| 1 | 1 | 0.019788N | 0.020618N | 0.021243N | 0.021454N | 0.021361N | 0.021029N |
| | 0 | 0.019106N | 0.019951N | 0.02057N | 0.02083N | 0.020807N | 0.020471N |
| 1.1 | 1.1 | 0.01952N | 0.020419N | 0.021092N | 0.021331N | 0.021174N | 0.020842N |
| | 0 | 0.018767N | 0.019645N | 0.020295N | 0.020571N | 0.020455N | 0.020154N |
| 1.2 | 1.2 | 0.019399N | 0.020298N | 0.021031N | 0.021192N | 0.021001N | 0.020681N |
| | 0 | 0.018392N | 0.0193N | 0.019928N | 0.02028N | 0.020098N | 0.019809N |
| 1.3 | 1.3 | 0.019086N | 0.019991N | 0.020541N | 0.020733N | 0.02061N | 0.020336N |
| | 0 | 0.01777N | 0.018746N | 0.019309N | 0.019613N | 0.019552N | 0.01926N |
| 1.4 | 1.4 | 0.018839N | 0.019661N | 0.0203N | 0.020592N | 0.020466N | 0.02014N |
| | 0 | 0.01707N | 0.017971N | 0.018612N | 0.018981N | 0.018899N | 0.018642N |
| 1.5 | 1.5 | 0.018396N | 0.019277N | 0.019933N | 0.020206N | 0.019987N | 0.01973N |
| | 0 | 0.016351N | 0.017193N | 0.017808N | 0.018163N | 0.018053N | 0.017876N |

In Table 1, the variation in the magnet size is as shown in FIG. 2. The magnet 6 has a trapezoidal shape, which is equivalent to a truncated square pyramid shape.

Supposing that the side length of the cut portion is L1, L1 is equivalent to the variation in the size of the trapezoidal shaped magnet relative to the triangular magnet. The second step portion is equivalent to a shape obtained by cutting a triangle from a right angle portion, and L2 is the side length of the cut triangle.

As can be seen from the data in Table 1, in the case where the variation L2 of reduction in the corner size of the housing is 1 mm and the corresponding variation L1 in the magnet size is also 1 mm, when the movement amount is 0 mm, that is, when the coil 7 is not moved, in the Example of a driving device in which the corner size of the housing is reduced inward, the generated Ampere force is 0.019788 N. In contrast to the present disclosure, in the Example of a conventional driving device in which the corner size of the housing is not reduced, the generated Ampere force is 0.019106 N. By comparison, it can be seen that the Ampere force generated in the Example of the driving device in which the corner size of the upper cover of the housing is reduced inward is larger than the Ampere force generated by the conventional driving device. Accordingly, when the coils 7 are moved upward by 0.05 to 0.25 mm, respectively, the Ampere forces generated in the Example of the driving device in which the corner size of the housing is reduced inward are larger than the Ampere forces generated by the conventional driving device.

TABLE 2

Comparison of the effects of different magnet arrangement modes

| Variation of reduction in the corner size of the casing L2 (mm) | Upward movement amount of the coil (mm)/Improved efficiency | | | | | |
|---|---|---|---|---|---|---|
| | 0 | 0.05 | 0.1 | 0.15 | 0.2 | 0.25 |
| 1 | 3.57% | 3.34% | 3.27% | 2.99% | 2.66% | 2.72% |
| 1.1 | 4.01% | 3.94% | 3.93% | 3.70% | 3.52% | 3.41% |
| 1.2 | 5.47% | 5.17% | 5.53% | 4.50% | 4.49% | 4.40% |
| 1.3 | 7.40% | 6.64% | 6.38% | 5.71% | 5.41% | 5.59% |
| 1.4 | 10.37% | 9.40% | 9.07% | 8.48% | 8.29% | 8.03% |
| 1.5 | 12.50% | 12.12% | 11.93% | 11.25% | 10.71% | 10.37% |

In Table 2, the efficiency improvement by the Ampere force generated by the driving device in which the corner size of the housing is reduced inward with respect to the Ampere force generated by the conventional driving device is calculated by the following formula:

efficiency improvement=(the Ampere force generated by the driving device in which the corner size of the housing is reduced inward—the Ampere force generated by the conventional driving device)/the Ampere force generated by the conventional driving device From the data in Table 2, it can be seen that: when the variation L2 of inward reduction in the corner size of the housing is 1 mm and the upward movement amount of the coil is 0 to 0.25, the efficiency improvement is between 2.72% to 3.57%; when the variation L2 of inward reduction in the corner size of the housing is increased up to 1.2 mm and the upward movement amount of the coil is 0 to 0.25 mm, the efficiency improvement is increased by 4.40% to 5.47%; and when the variation L2 of inward reduction in the corner size of the housing is increased up to 1.5 mm and the upward movement amount of the coil is 0 to 0.25 mm, the efficiency improvement is increased by 10.37% to 12.50%. It can be seen from the above mentioned variation tendency, at the same upward movement amount of the coil, the larger the variation L2 of inward reduction in the corner size of the housing becomes, the higher the efficiency improvement becomes.

From the comparison of the data in Table 1 and Table 2 above, it can be seen that by providing the corner portion 11 of the driving device housing 1 with the first step portion 12 and the second step portion 13, it is possible to increase the contact surface between the magnet 6 and the housing 1 at the second step portion 13, to reduce the loss of magnetic field, and to improve the magnetic permeability. When the same Ampere force is intended to be generated, that is, when the performance of the driving device is not affected, compared with the conventional driving device, by reducing the size of the magnet 6, for example, by thinning the thickness of the magnet 6, the use amount of the magnet 6 can be reduced, materials and costs can be saved. At the same time, the current amount energized to the coil 7 can also be reduced, thereby saving energy and reducing heat generation. Under the condition that the current energized in the coil 7 is the same and the size of the magnet 6 is the same, compared with the conventional driving device, the driving device according to the present embodiment can generate a larger Ampere force to generate a greater pushing force on the coil; and when the coil 7 drives the lens support 5 and the lens 8 to move linearly, it can drive a heavier lens to meet the market demand for high-resolution lenses. Furthermore, due to the provision of the first step portion 12 and the second step portion 13, the size of the corner space of the housing 1 can be further reduced to meet the market demand for miniaturization of the electronics.

Although one Example of the present embodiment is as described above, in other Examples of the present embodiment, the housing of the driving device may have more details in many aspects compared with the above-mentioned Example, and at least a part of these details may have various variations. At least a part of these details and variations will be described below based on some embodiments or Examples.

Specifically, as shown in FIG. 3, the housing 1 further includes an inner peripheral side wall 14 that extends from the edge portion of the opening 10 provided on the inner peripheral side of the housing top wall 17 toward the rear side. The inner peripheral side wall 14 is configured to correspond to each second step vertical wall 131 facing each other in a direction orthogonal to the axial direction of the housing 1. Specifically, the inner peripheral side wall 14 is provided on the outer side of the axis of the housing 1 corresponding to each magnet 6, and the magnetic field of the magnet 6 makes the region where the inner peripheral side wall 14 is located an effective magnetic field region. As can be seen from FIG. 5, the coil 7 is disposed between the magnet 6 and the inner peripheral side wall 14, and a magnetic circuit is formed between the inner peripheral side wall 14 and the side of the magnet 6 opposite the coil. When the coil 7 is energized with a current, the magnetic circuit can generate an Ampere force to the energized coil, thereby pushing the coil 7 to move.

In the present embodiment, the housing 1 further includes corner edge portion 18 at each corner portion 11 thereof. The corner edge portion 18 is formed so as to extend from the second step horizontal wall 132 toward the rear side of the housing, and the top surface thereof is equivalent to the second step horizontal wall 132. The length of the two straight edges of the corner edge portion 18 is the variation L2 of inward reduction in the corner size of the housing.

Figure 6:
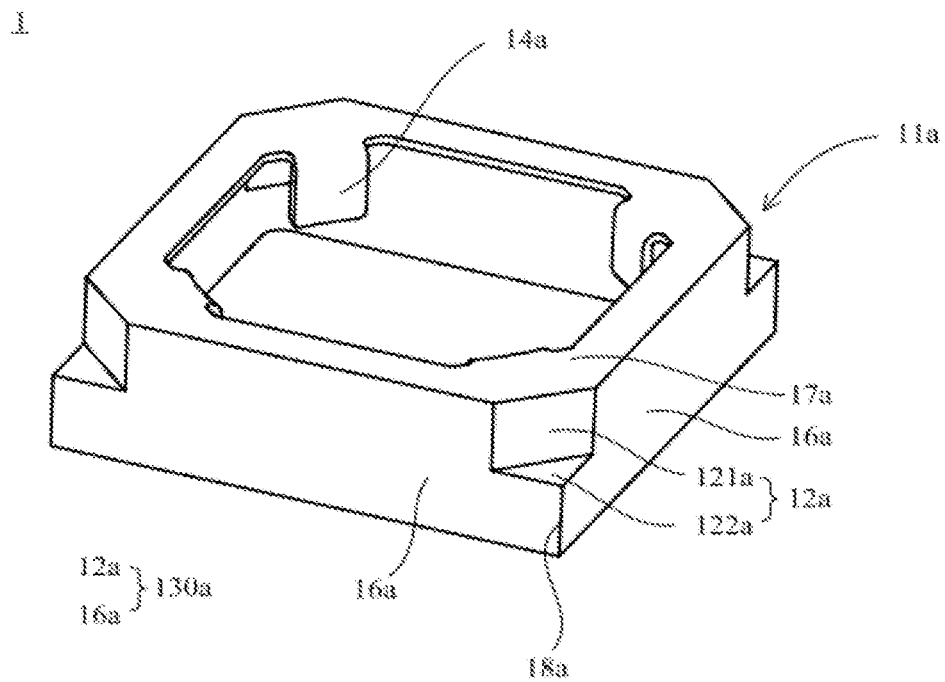
FIG. 6 is a schematic perspective view of a housing according to another embodiment.

FIG. 6 shows a schematic diagram of another embodiment of the housing 1. The difference from the embodiment shown in FIG. 3 is as follows: the corner portion 11a of the housing 1 also includes a corner edge portion 18a and a first step portion 12a; the first step portion 12a also includes a first step vertical wall 121a extending from the outer peripheral side of the housing top wall 17a toward the rear side, and a first step horizontal wall 122a extending from the rear side of the first step vertical wall 121a in a direction intersecting with the axial direction of the housing 1; the top surface of the corner edge portion 18a is equivalent to the first step horizontal wall 122a; and the inner peripheral wall surface of the first step vertical wall 121a and the inner peripheral wall surface of the outer peripheral side wall 16a adjacent thereto together form a magnet mounting portion 130a for mounting the magnet 6. Such arrangement can also increase the contact surface between the magnet 6 and the housing 1 as with the conventional way of setting the magnet at the corner portion of the housing, thereby reducing the loss of magnetic field and increasing the magnetic permeability. In the embodiment shown in FIG. 6, the inner peripheral side wall 14a in the housing 1 is arranged to be opposed to the first step vertical wall 121a in a direction orthogonal to the axial direction of the housing 1.

Figure 7:
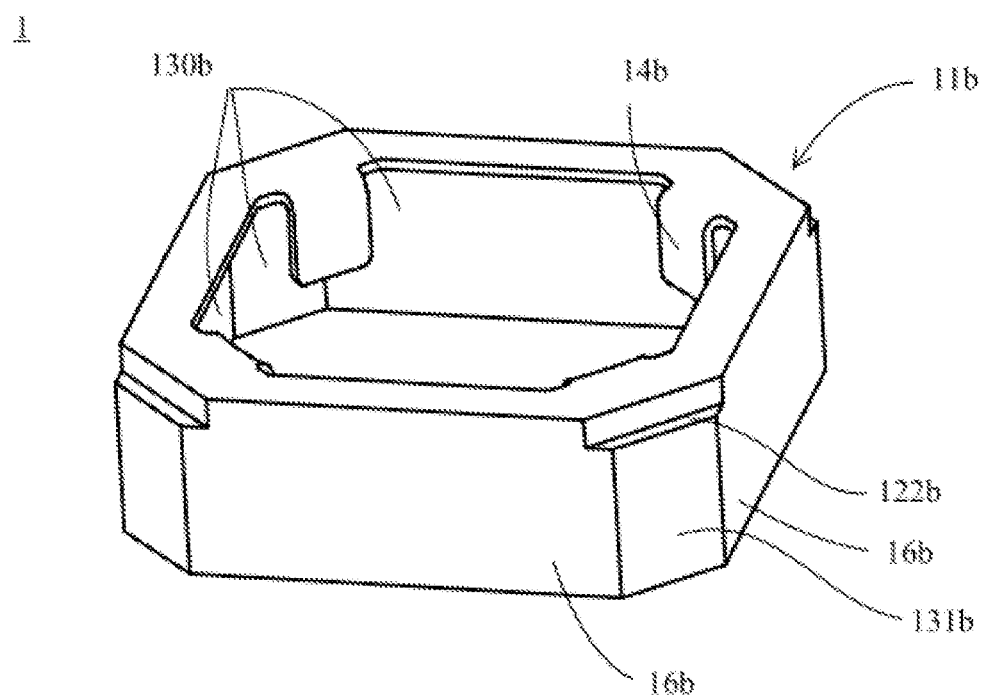
FIG. 7 is a schematic perspective view of a housing according to yet another embodiment.

FIG. 7 shows a schematic diagram of another embodiment of the housing 1. In this embodiment, the difference from the embodiment shown in FIG. 3 is that at the corner portion 11b of the housing 1, the second step vertical wall 131b may extend directly up to the rear side of the housing 1, thereby reducing the corner edge portion 18 compared with the embodiment shown in FIG. 3. At this time, the inner peripheral wall surface of the second step vertical wall 131b and the inner peripheral wall surface of the outer peripheral side wall 16b adjacent thereto form a magnet mounting portion 130b, and the first step horizontal wall 122b can be positioned relative to the magnet 6 during mounting. Of course, such arrangement can also increase the contact surface between the magnet 6 and the housing 1. In the embodiment shown in FIG. 7, the inner peripheral side wall 14b in the housing 1 is arranged to be opposed to the second step vertical wall 131b in a direction orthogonal to the axial direction of the housing 1.

Returning to the initial embodiment, and referring to FIG. 2 and FIG. 3 in combination, the magnet 6 has a trapezoidal shape as shown in the figure. The side surface 60 of the magnet 6 further includes a magnet outer peripheral side wall 601, a magnet inner peripheral side wall 602, and two magnet inclined side walls 603 connecting the magnet outer peripheral side wall 601 and the magnet inner peripheral side wall 602. Among them, the magnet outer peripheral side wall 601 corresponds to the top side of the trapezoidal shape, the magnet inner peripheral side wall 602 corresponds to the bottom side of the trapezoidal shape, and the two magnet inclined side walls 603 correspond to the two oblique sides of the trapezoidal shape. In the assembled state, the magnet outer peripheral side wall 601 and the two magnet inclined side walls 603 are respectively in close contact with the inner peripheral wall surface of the second step vertical wall 131 in the magnet mounting portion 130 and the inner peripheral wall surfaces of two outer peripheral side walls 16 adjacent thereto. Further, the magnet inner peripheral side wall 602 is disposed toward the inside of the cavity surrounded by the housing 1, so that a magnetic circuit is formed between the magnet inner peripheral side wall 602 and the inner peripheral side wall 14. Similarly, in the embodiment shown in FIG. 6, in the assembled state, the magnet outer peripheral side wall 601 and the two magnet inclined side walls 603 are respectively in close contact with the inner peripheral wall surface of the first step vertical wall 121a in the magnet mounting portion 130a and the inner peripheral wall surfaces of two outer peripheral side walls 16a adjacent thereto. In the embodiment shown in FIG. 7, in the assembled state, the magnet outer peripheral side wall 601 and the two magnet inclined side walls 603 are respectively in close contact with the inner peripheral wall surface of the second step vertical wall 131b in the magnet mounting portion 130b and the inner peripheral wall surfaces of two outer peripheral side walls 16b adjacent thereto.

In the initial embodiment, the housing 1 has a rectangular shape as shown in FIG. 3, and the magnets 6 are respectively disposed at four corner portions 11 of the housing 1. In some other embodiments different from that shown in the figures, the housing 1 may also have other suitable polygonal shapes.

Further, as shown in FIG. 3, the magnet inner peripheral side wall 602 of the magnet 6 and the inner peripheral side wall 14 respectively have an arc-shaped surface, and as shown in FIG. 2, also as for the coil 7, the surface facing the magnet inner peripheral side wall 602 of the magnet 6 and the surface facing the inner peripheral side wall 14 are also an arc-shaped surface. Since the arc-shaped surfaces are opposed to the coil 7, by providing the arc-shaped surfaces, the magnet 6 and the inner peripheral side wall 14 more uniformly oppose the coil, and the distance between the magnet 6 and the coil 7 can be reduced, the loss of magnetic field can be further reduced.

Further, as shown in FIG. 3, since the front side surface of the magnet 6 is restricted by the rear side surface of the first step horizontal wall 122 of the first step portion 12, the rear side surface of the first step horizontal wall 122 is provided as a positioning surface on the front side of the magnet 6 and the first step horizontal wall 122 plays a role of positioning in relation with the front side of the magnet 6.

As shown in FIG. 5, in an embodiment, the front side spring 3 is disposed between the first step horizontal wall 122 of the first step portion 12 and the lens support 5, and the first step horizontal wall 122 is configured so as to support the front side spring 3.

In one embodiment of the driving device, the driving device is disposed in the camera device and the lens 8 is the lens of the camera device. In one embodiment of the camera device, the aforementioned camera device is disposed in an electronic device such as a notebook computer or a mobile phone.

Figure 8:
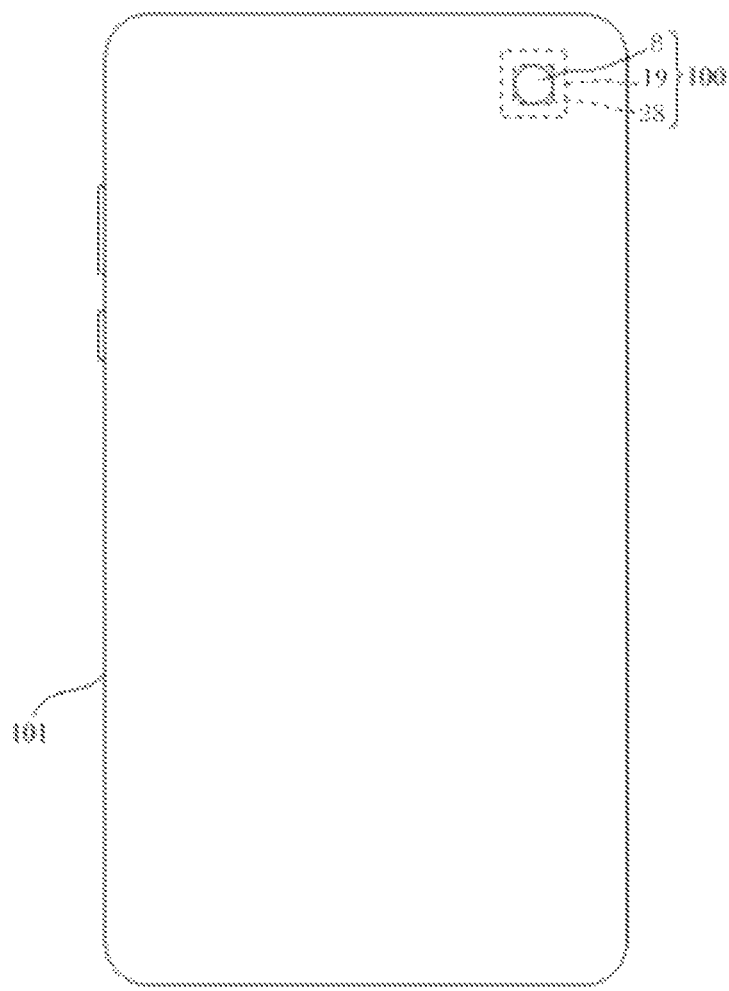
FIG. 8 is a front view of a smartphone mounted with a camera device including a driving device according to an embodiment of the present disclosure.

FIG. 6 shows an embodiment of an electronic apparatus including the camera device described above. The camera device 100 shown in FIG. 7 and FIG. 8 includes the driving device 19 according to an embodiment of the present disclosure, and is embedded in the case body of the smartphone 101 according to an embodiment of the present disclosure. The camera device 100 includes a lens support 5; an image sensor 8 converting light incident through the lens 8 supported by the lens support 5 into an image signal; and a driving device 9 constituted as described above.

The present disclosure is disclosed in the above preferred embodiments, but is not intended to limit the present disclosure, and any changes and modifications may be made by those skilled in the art without departing from the spirit and scope of the present disclosure. Therefore, any alternations, equivalent changes, and modifications made to the above examples in accordance with the technical essence of the present disclosure without departing from the technical solution of the present disclosure each shall fall within the scope of protection defined by the claims of the present disclosure.

What is claimed is:

1. A driving device housing made of permeability magnetic material, polygonal in outer shape, and with an axial direction, comprising:
    an outer peripheral side wall and a housing top wall connected to a front side of the outer peripheral side wall, the housing top wall being provided with an opening allowing light to pass through; and
    at least one step portion comprising a first step portion and a second step portion at each corner portion thereof,
    wherein the first step portion comprises:
        a first step vertical wall extending from an outer peripheral side of the housing top wall toward a rear side, and
        a first step horizontal wall extending from a rear side of the first step vertical wall in a direction intersecting with the axial direction;
    the second step portion comprises:
        a second step vertical wall extending from the first step horizontal wall toward a rear side, and
        a second step horizontal wall extending from a rear side of the second step vertical wall in a direction intersecting with the axial direction; and,
        a magnet mounting portion is formed by an inner peripheral wall surface of the second step vertical wall and an inner peripheral wall surface of the outer peripheral side wall adjacent thereto.

2. The driving device housing according to claim 1, wherein
    the second step vertical wall extends to a rear side of the housing.

3. The driving device housing according to claim 1, wherein
    the housing comprises a corner edge portion at each corner portion thereof and a top wall of the corner edge portion is equivalent to the second step horizontal wall.

4. The driving device housing according to claim 1, wherein the housing further comprises an inner peripheral side wall at each corner portion thereof,
    the inner peripheral side wall extends from an inner peripheral side of the housing top wall toward a rear side, and,
    in a direction orthogonal to the axial direction, the inner peripheral side wall is opposed to the second step vertical wall, the second step vertical wall forming the magnet mounting portion.

5. A driving device, comprising:
    the housing according to claim 2;
    a magnet disposed at the magnet mounting portion;
    a lens support disposed in the housing;
    a spring supporting the lens support on at least one of a front side and a rear side of the lens support;
    a coil disposed on an outer peripheral side of the lens support; and
    a base supporting the housing at a rear side of the housing;
    wherein, the magnet comprises a side surface in close contact with the inner peripheral wall surface of the second step vertical wall and the inner peripheral wall surface of the outer peripheral side wall adjacent thereto in the magnet mounting portion.

6. The driving device according to claim 5, wherein the magnet is in a truncated square pyramid shape and comprises a magnet outer peripheral side wall, a magnet inner peripheral side wall, and two magnet inclined side walls connecting the magnet outer peripheral side wall and the magnet inner peripheral side wall,
    the magnet outer peripheral side wall is taken as a top side of the truncated square pyramid shape, the magnet inner peripheral side wall is taken as a bottom side of the truncated square pyramid shape, the two magnet inclined side walls are taken as oblique sides of the truncated square pyramid shape,
    the magnet outer peripheral side wall, the two magnet inclined side walls are respectively in close contact with the inner peripheral wall surface of the second step vertical wall and the inner peripheral wall surface of the outer peripheral side wall adjacent thereto in the magnet mounting portion, and the magnet inner peripheral side wall is disposed toward an inside of a cavity surrounded by the housing.

7. The driving device according to claim 6, wherein the magnet inner peripheral side wall of the magnet and an inner peripheral side wall extending from the inner peripheral side of the housing top wall and facing the magnet inner peripheral side wall have an arc-shaped surface, respectively.

8. The driving device according to claim 5, wherein the housing is in a rectangular shape.

9. The driving device according to claim 5, wherein the rear side surface of the first step horizontal wall is provided as a positioning surface of a front side of the magnet.

10. The driving device according to claim 5, wherein the first step horizontal wall is provided with a front side spring supporting the lens support.

11. A camera device, comprising the driving device according to claim 5.

12. An electronic device, comprising the camera device according to claim claim 11.

13. A driving device housing made of permeability magnetic material, polygonal in outer shape, and with an axial direction, comprising:
- an outer peripheral side wall and a housing top wall connected to a front side of the outer peripheral side wall, the housing top wall being provided with an opening allowing light to pass through; and
- at least one step portion comprising a first step portion and a corner edge portion at each corner portion thereof,
- wherein the first step portion comprises:
- a first step vertical wall extending from an outer peripheral side of the housing top wall toward a rear side, and
- a first step horizontal wall extending from a rear side of the first step vertical wall in a direction intersecting with the axial direction;
- a top wall of the corner edge portion is equivalent to the first step horizontal wall, and,
- a magnet mounting portion is formed by an inner peripheral wall surface of the first step vertical wall and an inner peripheral wall surface of the outer peripheral side wall adjacent thereto.

14. The driving device housing according to claim 13, wherein,
- the housing further comprises an inner peripheral side wall at each corner portion thereof,
- the inner peripheral side wall extends from an inner peripheral side of the housing top wall toward a rear side, and,
- in a direction orthogonal to the axial direction the inner peripheral side wall is opposed to the first step vertical wall, the first step vertical wall that-forming the magnet mounting portion.

15. A driving device, comprising:
- the housing of the driving device housing according to claim 3;
- a magnet disposed at the magnet mounting portion;
- a lens support disposed in the housing;
- a spring supporting the lens support on at least one of a front side and a rear side of the lens support;
- a coil disposed on an outer peripheral side of the lens support; and
- a base supporting the housing at a rear side of the housing;
- wherein, the magnet comprises a side surface in close contact with the inner peripheral wall surface of the first step vertical wall and the inner peripheral wall surface of the outer peripheral side wall adjacent thereto in the magnet mounting portion.

16. A camera device, comprising the driving device according to claim 15.

17. An electronic device, comprising the camera device according to claim 16.

* * * * *